(12) United States Patent  
Okada

(10) Patent No.: US 8,928,780 B2  
(45) Date of Patent: Jan. 6, 2015

(54) ADJUSTMENT METHOD, ADJUSTMENT APPARATUS, METHOD OF MANUFACTURING OPTICAL SYSTEM, IMAGE PICKUP APPARATUS, AND METHOD OF MANUFACTURING IMAGE PICKUP APPARATUS

(75) Inventor: Takashi Okada, Saitama (JP)

(73) Assignee: Canon Kabushiki Kaisha (JP)

( * ) Notice: Subject to any disclaimer, the term of this patent is extended or adjusted under 35 U.S.C. 154(b) by 345 days.

(21) Appl. No.: 13/277,325

(22) Filed: Oct. 20, 2011

(65) Prior Publication Data

US 2012/0105649 A1 May 3, 2012

(30) Foreign Application Priority Data

Nov. 1, 2010 (JP) ................................. 2010-244907  
Aug. 22, 2011 (JP) ................................. 2011-180467

(51) Int. Cl.  
*H04N 5/217* (2011.01)  
*H04N 17/00* (2006.01)

(52) U.S. Cl.  
CPC .................................. *H04N 17/002* (2013.01)  
USPC ........................................ 348/241; 348/335

(58) Field of Classification Search  
USPC ......... 348/222.1, 241, 335; 382/312, 255, 224  
See application file for complete search history.

(56) References Cited

U.S. PATENT DOCUMENTS

| 7,885,489 B2* | 2/2011 | Hayashi et al. | 382/312 |
| 2008/0284896 A1* | 11/2008 | Robinson et al. | 348/335 |

FOREIGN PATENT DOCUMENTS

| JP | 2003-060916 A | 2/2003 |
| JP | 2003-235794 A | 8/2003 |
| JP | 2008-061104 A | 3/2008 |
| JP | 2008-085697 A | 4/2008 |
| JP | 2008-187437 A | 8/2008 |
| JP | 2009-009593 A | 1/2009 |
| JP | 2009-168997 A | 7/2009 |
| JP | 2010-087672 A | 4/2010 |

OTHER PUBLICATIONS

Japanese Office Action cited in Japanese counterpart application No. JP2011-180467, dated Oct. 29, 2013.  
Office Action issued in counterpart Japanese Patent Application No. 2011-180467, dated Feb. 12, 2014.  
Japanese Office Action cited in Japanese counterpart application No. JP2011-180467, dated Jul. 30, 2013.

* cited by examiner

*Primary Examiner* — Tuan Ho  
(74) *Attorney, Agent, or Firm* — Rossi, Kimms & McDowell LLP

(57) ABSTRACT

An adjustment method of the present invention includes an evaluation step of evaluating an imaging performance of an optical image that is formed via an optical system, a classification step of classifying the imaging performance evaluated in the evaluation step, a restoration step of generating a restored image of the optical image based on a classification of the imaging performance, and an adjustment step of adjusting the optical system using an adjustment unit of the optical system based on the restored image.

18 Claims, 10 Drawing Sheets

ADJUSTMENT METHOD, ADJUSTMENT APPARATUS, METHOD OF MANUFACTURING OPTICAL SYSTEM, IMAGE PICKUP APPARATUS, AND METHOD OF MANUFACTURING IMAGE PICKUP APPARATUS

BACKGROUND OF THE INVENTION

1. Field of the Invention

The present invention relates to an adjustment method using an image restoration processing, an adjustment apparatus, a method of manufacturing an optical system, an image pickup apparatus, and a method of manufacturing the image pickup apparatus.

2. Description of the Related Art

A method of correcting a blurred image that is generated by aberrations of an optical system by digital processing using information of an optical transfer function (OTF) is known. This method is called an image restoration or an image recovery, and hereinafter, the processing of correcting a deterioration of an image using the information of the optical transfer function of the optical system is referred to as an image restoration processing or a restoration processing. In an actual manufacturing setting, production variability is generated for a performance of the optical system because of a production error of a lens, a production error of a barrel that holds the lens, or the like. When there is a difference between aberration characteristics that are generated in an actual shooting and aberration characteristics that are assumed in the restoration processing, a negative effect such as a ringing may be generated as an artifact in a restored image. Therefore, the production variability may give the negative effect to the restored image. Previously, as a method of reducing the production variability, adjustment of decentering a part of the optical system or an image pickup element for the optical system having the variability has been performed.

On the other hand, Japanese Patent Laid-Open No. 2009-9593 discloses a method of including the image restoration processing as an evaluation reference at the time of adjustment to perform the adjustment considering a total performance including the image restoration processing. Japanese Patent Laid-Open No. 2008-85697 discloses an adjustment method considering the production variability. In Japanese Patent Laid-Open No. 2008-85697, a plurality of aberration characteristics are prepared at a side of an image pickup apparatus and the optimum aberration characteristic is selected in accordance with the production variability to reduce the production variability.

However, in the method disclosed in Japanese Patent Laid-Open No. 2009-9593, the performance variability that finally remains when the production variability is generated in the image pickup apparatus is emphasized by image restoration processing. In order to avoid this, a parameter in generating a restoration filter needs to be changed to adjust the balance with an amount of the negative effect while decreasing the level of the restoration. In the method disclosed in Japanese Patent Laid-Open No. 2008-85697, the restoration filter is stored in the image pickup apparatus and therefore a memory capability of the filter is enlarged. The restoration filter that is used in the image pickup apparatus is determined by at least one parameter of an image height, a focal length, an object distance, Fno (F-number), and an image stabilizing state of the image pickup apparatus. Accordingly, the restoration filter that includes the production variability needs an enormous memory capability.

BRIEF SUMMARY OF THE INVENTION

The present invention provides an adjustment method of reducing a performance deterioration caused by a production variability of an optical system and a light receiving element with a small storage capacity, an adjustment apparatus, a method of manufacturing the optical system, an image pickup apparatus, and a method of manufacturing the image pickup apparatus.

An adjustment method as one aspect of the present invention includes an evaluation step of evaluating an imaging performance of an optical image that is formed via an optical system, a classification step of classifying the imaging performance evaluated in the evaluation step, a restoration step of generating a restored image of the optical image based on a classification of the imaging performance, and an adjustment step of adjusting the optical system using an adjustment unit of the optical system based on the restored image.

An adjustment method as another aspect of the present invention includes an adjustment step of adjusting an optical system using an adjustment unit of the optical system, an evaluation step of evaluating an imaging performance of an optical image that is formed via the optical system adjusted in the adjustment step, a classification step of classifying the imaging performance evaluated in the evaluation step, and a storage step of storing at least one of an optical transfer function and an image restoration filter that corresponds to a classification of the imaging performance in a storage portion of an image pickup apparatus that includes the optical system adjusted in the adjustment step.

An adjustment apparatus as another aspect of the present invention includes an evaluation portion configured to evaluate an imaging performance of an optical image that is formed via an optical system, a classification portion configured to classify the imaging performance evaluated by the evaluation portion, a restoration portion configured to generate a restored image of the optical image based on a classification of the imaging performance, and an adjustment portion configured to adjust the optical system using an adjustment unit of the optical system based on the restored image.

An adjustment apparatus as another aspect of the present invention includes an adjustment portion configured to adjust an optical system using an adjustment unit of the optical system, an evaluation portion configured to evaluate an imaging performance of an optical image that is formed via the optical system adjusted by the adjustment portion, a classification portion configured to classify the imaging performance evaluated by the evaluation portion, and a portion configured to store at least one of an optical transfer function and an image restoration filter that corresponds to a classification of the imaging performance in a storage portion of an image pickup apparatus that includes the optical system adjusted by the adjustment portion.

A method of manufacturing an optical system as another aspect of the present invention includes an evaluation step of evaluating an imaging performance of an optical image that is formed via the optical system, a classification step of classifying the imaging performance evaluated in the evaluation step, a restoration step of generating a restored image of the optical image based on a classification of the imaging performance, and an adjustment step of adjusting the optical system using an adjustment unit of the optical system based on the restored image.

A method of manufacturing an image pickup apparatus as another aspect of the present invention includes an adjustment step of adjusting an optical system using an adjustment unit of the optical system, an evaluation step of evaluating an imaging performance of an optical image that is formed via the optical system adjusted in the adjustment step, a classification step of classifying the imaging performance evaluated in the evaluation step, and a storage step of storing at least one of an optical transfer function and an image restoration filter that corresponds to a classification of the imaging performance in a storage portion of the image pickup apparatus that includes the optical system adjusted in the adjustment step.

An image pickup apparatus as another aspect of the present invention is adjusted by using the adjustment method.

Further features and aspects of the present invention will become apparent from the following description of exemplary embodiments with reference to the attached drawings.

DETAILED DESCRIPTION OF THE PREFERRED EMBODIMENTS

Figure 1:
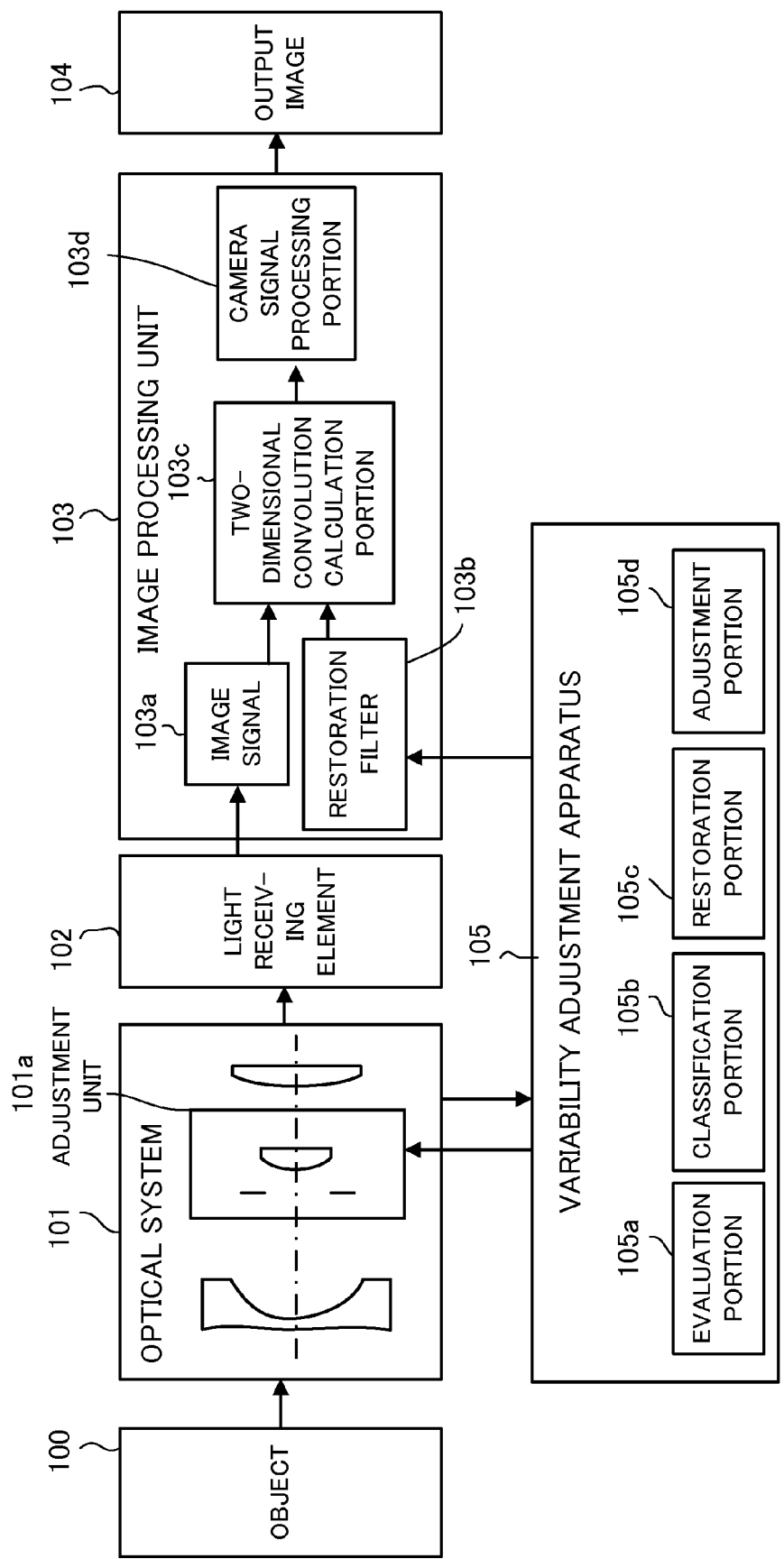
FIG. 1 is a schematic configuration diagram of an image pickup apparatus in the present embodiment.

Exemplary embodiments of the present invention will be described below with reference to the accompanied drawings. In each of the drawings, the same elements will be denoted by the same reference numerals and the duplicate descriptions thereof will be omitted.

First of all, an image pickup apparatus in an embodiment of the present invention will be described. FIG. 1 is a schematic configuration diagram of the image pickup apparatus in the present embodiment. The image pickup apparatus includes an optical system 101 (an image pickup optical system), a light receiving element 102 (an image pickup element or a photoelectric conversion element), and an image processing unit 103. The image pickup apparatus in the present embodiment is configured to as to correct a performance deterioration caused by production variability of the optical system 101 and the light receiving element 102. The optical system 101 transmits an image of an object 100 to the light receiving element 102. The optical system 101 includes an adjustment unit 101a that is driven by a variability adjustment apparatus 105 to optically correct the performance deterioration caused by the production variability of the optical system 101 and the light receiving element 102.

An image (an optical image) of the object 100 that is formed by the optical system 101 is converted into an electric signal by the light receiving element 102, and is sent to the image processing unit 103 as an image signal 103a. As described below, the image processing unit 103 performs an image processing by a restoration filter 103b that is based on an optical transfer function (OTF) of the optical system 101. Specifically, the image processing unit 103 performs a two-dimensional convolution calculation of the image signal 103a and the restoration filter 103b that is previously stored in a storage portion (not shown) in a two-dimensional convolution calculation portion 103c. As the restoration filter 103b, a desired restoration filter is selected to be used by using information of the optical transfer function (OTF) based on a classification by a classification portion 105b in the variability adjustment apparatus 105 described below, i.e. based on an imaging state.

The image signal for which the two-dimensional convolution processing has been performed in the two-dimensional convolution calculation portion 103c is inputted into a camera signal processing portion 103d. The camera signal processing portion 103d performs camera signal processings such as a demosaicing, a white balance adjustment, an edge enhancement processing, and a noise reduction processing to output an output image 104. In the present embodiment, the camera signal processing is performed after the two-dimensional convolution calculation, but the present embodiment is not limited to this. The same effect can be obtained even if the order is reversed to perform a part of the camera signal processings before the two-dimensional convolution calculation.

Hereinafter, the optical system 101 and the image processing unit 103 in the present embodiment will be specifically described. The optical system 101 forms an image that is blurred by a spherical aberration, a coma aberration, a field curvature, astigmatism, or the like on the light receiving element 102. The blur of the image is generated by forming the image since a light beam emitted from one point of the object 100 spreads to form the image on an imaging plane (the light receiving element 102) although originally it is to be focused on one point on the light receiving element 102 again. Optically it is called a point spread function (PSF), but this is called a blur of an image in the present embodiment. For example, the blur of the image includes an out-of-focus image, but in the present embodiment the blur of the image means a blur of an image that is caused by the influence of the aberration of the optical system 101 even when the image is particularly in focus.

The optical system 101 of the present embodiment is configured by including a lens, but the present embodiment can also be applied to the deterioration of an image that is generated when an optical system that includes a mirror (a reflecting surface) having a radius of curvature is used instead of the lens. The optical transfer function (OTF) can includes not only the optical system 101 but also other factors that deteriorate the optical transfer function (OTF) during taking the image. For example, an optical low-pass filter that has a birefringence suppresses a high-frequency component with respect to frequency characteristics of the optical transfer function (OTF). Additionally, the factor may include an opening shape or spectral characteristics of the light receiving element of the light source, or spectral characteristics of various kinds of wavelength filters. It is preferred that the image processing unit 103 be configured so as to perform an image restoration processing based on the optical transfer function (OTF) in a broad sense including them.

The image restoration processing in the present embodiment can also be applied to an image generation apparatus that does not include an image pickup optical system. For example, a scanner (a readout apparatus) or an X-ray image pickup apparatus in which an image pickup element closely contacts an object surface to take an image does not have the image pickup optical system such as a lens, but an output image may be deteriorated by an image sampling by the image pickup element or the like. Since characteristics of the deterioration are a transfer function of an image pickup system although they are not caused by the image pickup optical system, they correspond to the optical transfer function (OTF) described above. Accordingly, a restoration image can be generated if the image restoration filter is generated based on the transfer function even when the image pickup optical system is not included.

Furthermore, in a real image pickup apparatus, variability is generated in the optical transfer function (OTF) in accordance with a radius of curvature, an interval of surfaces, a refractive index, or a decentering of a lens, a decentering of a lens unit, a decentering of the light receiving element, or the like, caused by a production error (a production variability). In the present embodiment, the adjustment unit 101a in the optical system 101 is decentered in a direction perpendicular to an optical axis using the variability adjustment apparatus 105 to cancel the deterioration characteristics that are caused by the variability. Thus, the adjustment unit 101a optically corrects the performance deterioration caused by the production variability of the optical system 101 and the light receiving element 102. The adjustment unit 101a is not limited to canceling a part of the optical system 101, but it may cancel the blur of the image caused by the optical transfer function (OTF) for whole of the optical system 101, the light receiving element 102, or the like. Furthermore, the adjustment unit 101a is configured so as to change the optical transfer characteristics, and for example a parallel decentering or a tilt decentering of an optical element such as a lens is performed. The adjustment unit 101a may also be configured by using a light modulation element.

The blurred image generated by the optical system 101 is imaged on the light receiving element 102. In the present embodiment, the light receiving element 102 is an element that converts an analog signal (an optical image) that is generated by the formation of the image of the optical system 101 into an electric image signal, such as a CCD or a CMOS sensor. However, the light receiving element 102 is limited to this and the light receiving element 102 is sufficient if it is configured so that the image having the deterioration characteristics by the optical transfer function (OTF) of the optical system 101 can be converted into the image signal. Imaging conditions such as a focal length of the lens, a stop, or an object distance or various kinds of correction information for correcting the image can be added to the image signal outputted in this time. When a series of the processings from taking the image to the output of the image are performed in a closed image pickup apparatus, the imaging condition information or the correction information can be obtained in the image pickup apparatus without adding the imaging condition information or the correction information to the image. The image processing unit 103 performs the image restoration processing by receiving the image signal from the light receiving element 102. Hereinafter, an outline of the image restoration processing in the present embodiment will be described.

When a deteriorated image, an original image, and a point spread function (PSF) that is a Fourier pair of the optical transfer function (OTF) are defined as g(x,y), f(x,y), and h(x,y), respectively, following Expression (1) is met. In Expression (1), symbol "*" denotes a convolution and symbol "(x,y)" denotes a coordinate on an image.

$$g(x,y) = h(x,y) * f(x,y) \quad (1)$$

When Fourier transfer is performed for Expression (1) to be converted into a display form on a frequency plane, it becomes a form of product each frequency as represented by following Expression (2).

$$G(u,v) = H(u,v) \cdot F(u,v) \quad (2)$$

In Expression (2), symbol H denotes a value that is obtained by performing the Fourier transfer for the point spread function (PSF) h, i.e. the optical transfer function (OTF), and symbols G and F are values that are obtained by performing the Fourier transfer for the deteriorated image g and the original image f, respectively. Symbol (u,v) denotes an coordinate on a two-dimensional frequency plane, i.e. a frequency.

In order to obtain the original image from the taken deteriorated image, both sides of Expression (2) are divided by H as represented by following Expression (3).

$$G(u,v)/H(u,v) = F(u,v) \quad (3)$$

In Expression (3), inverse Fourier transform is performed for F(u, v), i.e. G(u, v)/H (u, v), to be returned to a real surface to obtain the original image f(x, y) as a restored image. In the embodiment, when a value obtained by performing the inverse Fourier transform for 1/H is defined as R, as represented by following Expression (4), the original image can also be obtained by performing a convolution processing for an image on the real surface.

$$g(x,y) * R(x,y) = f(x,y) \quad (4)$$

In Expression (4), R(x,y) is called an image restoration filter. In the present embodiment, the optical transfer function and the image restoration filter are referred to as optical transfer characteristics. When the image is a two-dimensional image, commonly this image restoration filter is also a two-dimensional filter that has taps (cells) corresponding to each pixel of the image. Generally, as the number of the taps of the image restoration filter (the number of the cells) is larger, restoration accuracy is improved. Therefore, it is preferred that the realistic number of the taps be set to be used in accordance with a required image quality, an image processing capability, characteristics of aberrations, or the like. Since the filter of performing the image restoration needs to reflect at least the characteristics of the aberrations, it is a technology that is different from a conventional edge enhancement filter (a high-pass filter) having around three taps for each of horizontal and vertical directions or the like.

Figure 2:
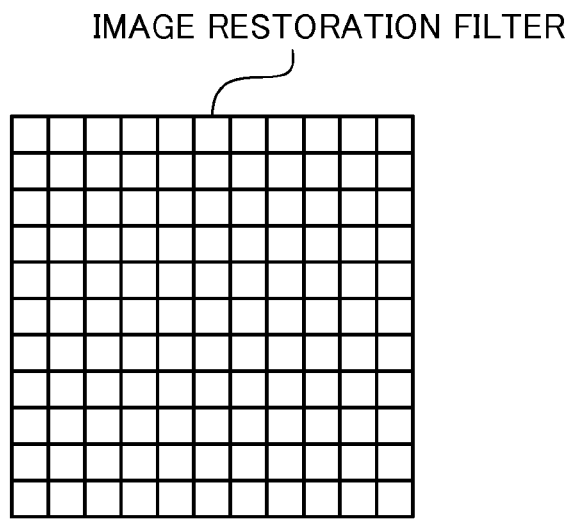
FIG. 2 is a configuration diagram of an image restoration filter in the present embodiment.

In FIG. 2, as one example, a two-dimensional filter having 11×11 taps is illustrated. Each tap of the two-dimensional filter corresponds to each pixel of the image to perform a two-dimensional convolution calculation in a step of the image restoration processing. In the convolution calculation, in order to improve a signal value of a specific pixel, the pixel is coincident with a center of the image restoration filter. Then, a product of the signal value of the image and a coefficient value of the filter is calculated for each image and each pixel corresponding to the image restoration filter, and the sum is replaced as a signal value of a center pixel.

Figure 3:
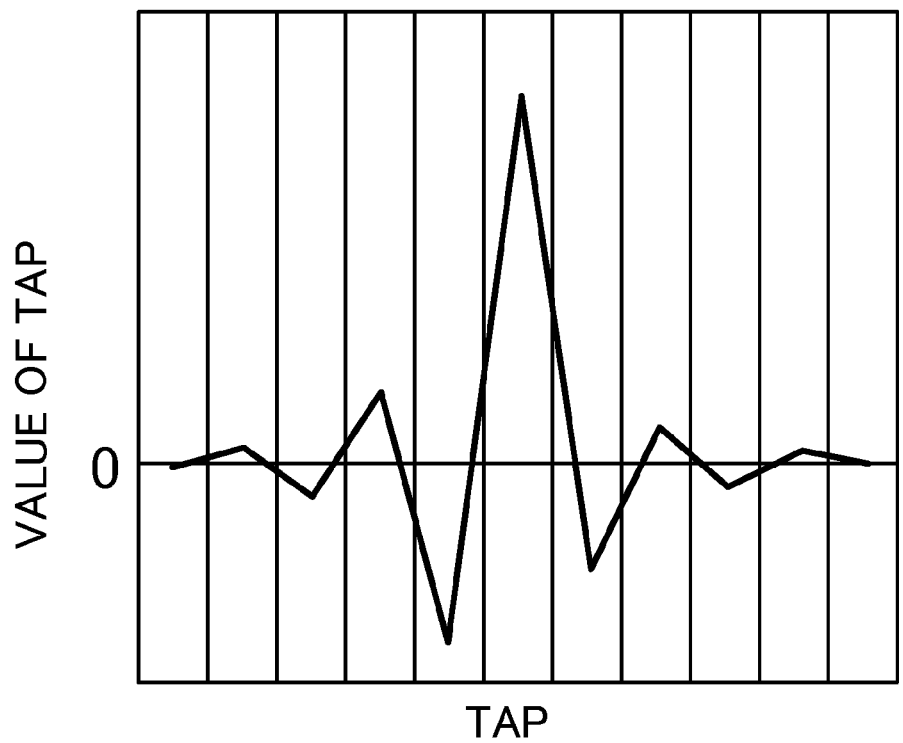
FIG. 3 is a diagram illustrating a value of a tap of the image restoration filter in the present embodiment.

A value in each tap is omitted in FIG. 2, and FIG. 3 illustrates one cross section of the image restoration filter. A distribution of a value (a coefficient value) of each tap of the image restoration filter ideally has a role of returning the spatially-broad signal value to the original one point. The image restoration filter can be obtained by calculating or measuring the optical transfer function (OTF) of the image pickup optical system and then performing the inverse Fourier transform for the function based on the inverse function as described above. A convolution processing of the image restoration filter in such a real space is performed for the image signal from the light receiving element 102 to be able to restore the image without performing the Fourier transform or the inverse Fourier transform of the image in the step of the image restoration processing.

Since an actual image contains a noise component, the noise component is amplified in accordance with the restoration of the deteriorated image when the image restoration filter that is generated by applying the inverse of the optical transfer function (OTF) as described above is used. Therefore, generally a good image cannot be obtained. This can be represented as following Expressions (5) and (6). In Expressions (5) and (6), symbol N denotes a noise component.

$$G(u,v)=H(u,v)\cdot F(u,v)+N(u,v) \quad (5)$$

$$G(u,v)/H(u,v)=F(u,v)+N(u,v)/H(u,v) \quad (6)$$

Figure 4:
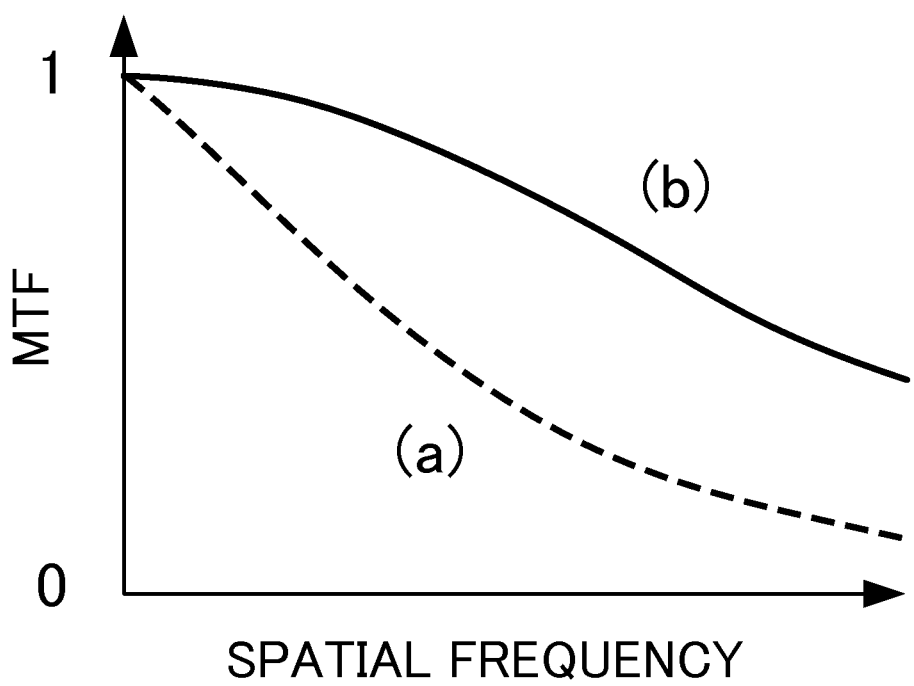
FIG. 4 is a diagram illustrating a relationship between an absolute MTF of an optical transfer function and a spatial frequency in the present embodiment.

In this regard, for example, a method of controlling the level of restoration in accordance with an intensity ratio of the image signal and the noise signal (signal-to-noise ratio: SNR) as illustrated in FIG. 4 is known. FIG. 4 illustrates a relationship between an absolute value of the optical transfer function (MTF) and a spatial frequency. The representative restoration filter that is used in this method is called Wiener filter. This restoration filter suppresses the amplification as the absolute value (MTF) of the optical transfer function (OTF) becomes smaller, and it enhances the amplification as the absolute value (MTF) of the optical transfer function (OTF) becomes larger for each frequency. Generally, the absolute value (MTF) of the optical transfer function (OTF) of the image pickup optical system becomes smaller at a high-frequency side (see a dashed line (a) in FIG. 4). Therefore, this method is substantially a method of suppressing the level of restoration at the high-frequency side of the image (see a solid line (b) in FIG. 4).

Figure 5:
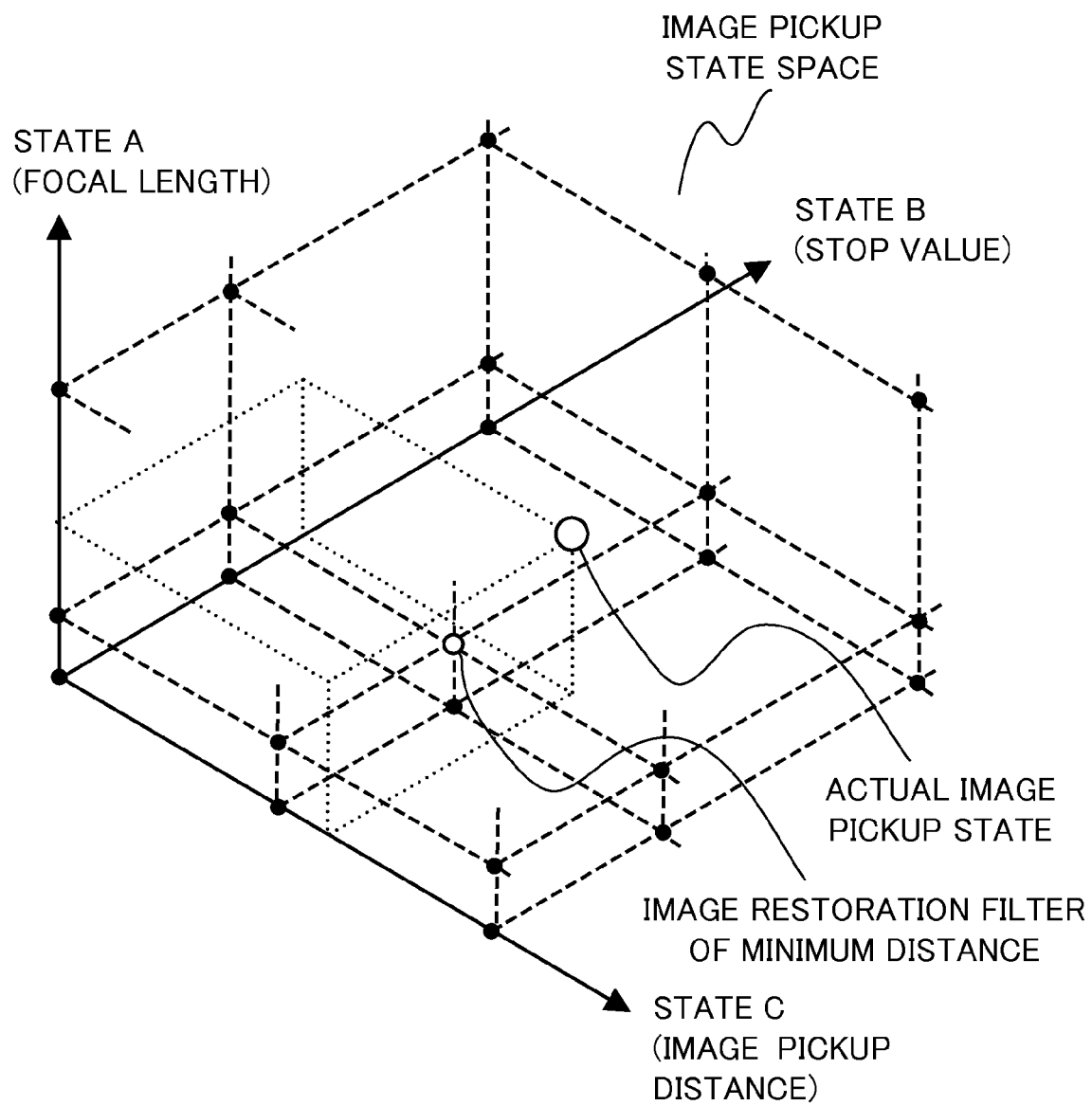
FIG. 5 is a schematic diagram of the image restoration filter (an image restoration filter group) in the present embodiment.

The optimal restoration filter needs to be used in accordance with an image pickup state. In an actual image pickup apparatus, the image restoration filter in accordance with the image pickup state or the information related to the imaging state is stored in a storage portion (not shown) in the image pickup apparatus of FIG. 1. FIG. 5 is a schematic diagram of the image restoration filter (an image restoration filter group) that is stored in the storage portion. The image restoration filter is discretely arranged in an image pickup state space where three states of a zoom position (a focal length), a stop diameter (a stop value), and an object distance (an image pickup distance) are set to axes. A coordinate of each point (a black circle) in the space of the image pickup state is a state position of the previously-stored image restoration filter. In FIG. 5, the position of the filter is arranged on a grating point that is orthogonal to each state for descriptions, but each filter may be displaced from the grating point. With respect to the number of types of the image pickup states, a three-dimensional diagram for three states is illustrated, but an image pickup state space having four or more dimensions that is intended for four or more states may also be adopted.

Next, a method of specifically selecting the image restoration filter will be described. In FIG. 5, the state that is indicated by a large white circle is defined as an actual image pickup state. When the filter exists at the actual image pickup state position or its vicinity, the filter can be selected to be used for the image restoration processing. One is a method of calculating a distance between the actual image pickup state and the stored image pickup state in the image pickup state space to select the filter having the shortest distance. In FIG. 5, the filter at a position indicated by a small white circle is selected. There is another method of weighting a direction of the image pickup state space in selecting the filter. In other words, it is a method of selecting the filter considering the product of the distance in the image pickup state space and the distance weight as an evaluation function.

Subsequently, a camera signal processing is performed for the image from which the blur is removed by the image restoration processing. The camera signal processing is an image processing in which the optical transfer function (OTF) is not used, such as a demosaicing processing, a white balance adjustment, an edge enhancement, or a noise reduction processing for a RAW image. A distortion correction, a chromatic aberration of magnification, or a shading correction which performs a geometric aberration correction without using the filter in the image processings in which the optical transfer function (OTF) is used is also a part of the camera signal processing. These image processings can also be inserted before or after performing the two-dimensional convolution calculation if necessary.

Figure 6B:
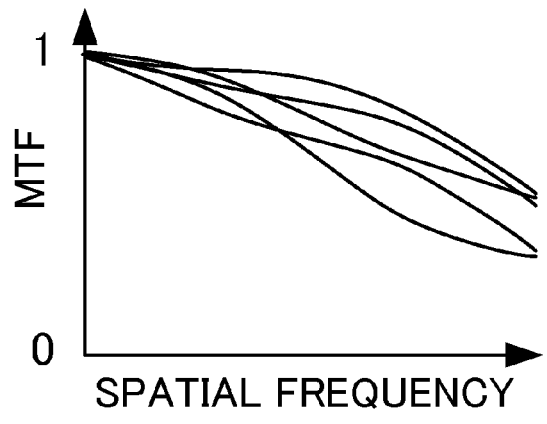
FIGS. 6A to 6C are diagrams of describing production variability images and restored images in an image pickup apparatus in the present embodiment.
Figure 6A:
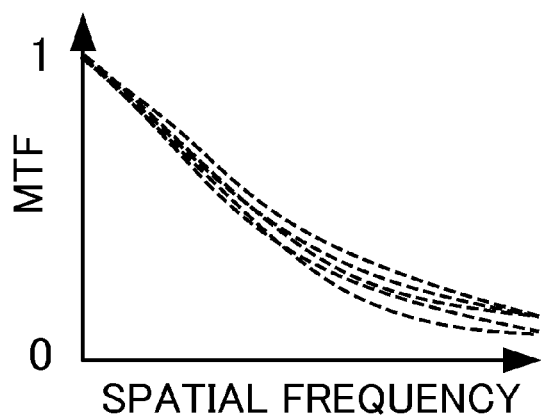
Figure 6C:
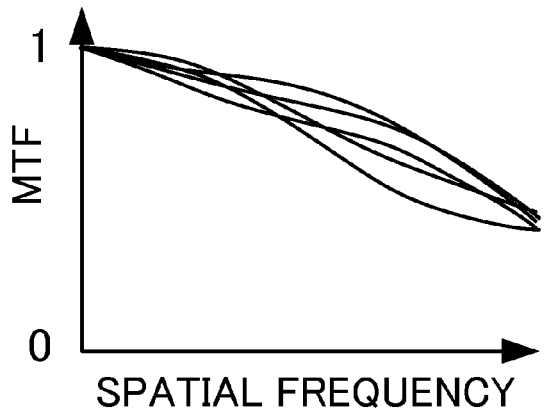

Next, the adjustment of the optical system 101 will be specifically described. As described above, in the step of an actual manufacture, the production variability is generated in the image pickup apparatus. This production variability causes a variability of the optical transfer function (OTF) of the image pickup apparatus at the same time. When the image restoration processing is performed at a constant restoration level using a specific optical transfer function for the optical system 101 having the production variability, for example an optical transfer function based on a designed value, the performance variability of the image pickup apparatus is also amplified in accordance with the level of the restoration. FIGS. 6A to 6C are results of generating the restoration filter using the optical transfer function based on a design value for the optical system 101 that has the product variability (FIG. 6A) to perform the image restoration processing (FIG. 6B). The restoration filter in this case is assumed to be the Wiener filter, but the level of the restoration at the high frequency of the MTF is suppressed. Therefore, the level of the restoration at an intermediate frequency is the highest, and the performance variability in this region is large. As can be seen from the fact that the image restoration filter is given by the inverse Fourier transform of the optical transfer function, the level of the restoration of the image restoration filter is high when the imaging performance of the optical system 101 is low, i.e. the absolute value (MTF) of the optical transfer function is small. In such an image pickup apparatus, the performance variability caused by the production variability is easily enlarged.

As a method of solving this phenomenon, a method of performing an adjustment that is suitable for the restoration filter while evaluating the performance after the image restoration processing is considered. In this method, however, fundamental performance variability is not expected since the restoration filter is a specific filter. In order to have a fundamental solution, it is considered that the optical transfer function (OTF) of the manufactured image pickup apparatus is individually measured to generate the restoration filter that is suitable for each image pickup apparatus. However, in order to realize this, a construction of a new production line and an increase of a production cost are expected and therefore it is not realistic.

In the present embodiment, a plurality of patterned restoration filters 103*b* are used to improve the production variability (FIG. 6C). When viewing the production variability that remains after the conventional adjustment at the time of the manufacturing, for example rotationally asymmetric aberrations that have different performances at four corners of the image or asymmetric aberrations that are generated in spite of the center of the image are remarkable. Thus, the deteriorated characteristics that remain after the adjustment can be classified as aberrations of 3 to 10 patterns. In the present embodiment, focusing on this point, an adjustment is performed by using various kinds of restoration filters 103*b* to suppress the amplification of the production variability and the increase of the production cost. The restoration filter 103*b* that is used in this case corrects the asymmetric aberration with respect to the image center as described above, and it is preferred that at least one of several kinds of restoration filters be asymmetric with respect to the image center. As the plurality of patterned restoration filters 103*b*, for example a restoration filter that restores (suppresses) an amount of generating the aberration such as a one-sided aberration (a decentering coma aberration), a center coma aberration, a chromatic aberration, or a spherical aberration is used, and an appropriate restoration filter is selected from these filters.

As illustrated in FIG. 1, the variability adjustment apparatus 105 is configured by including an evaluation portion 105*a*, a classification portion 105*b*, a restoration portion 105*c*, and an adjustment portion.

The evaluation portion 105*a* is a portion that receives an optical image to evaluate the level of the performance deterioration (the imaging performance) of the optical system 101. For example, a chart for evaluating the imaging performance of the optical system 101 is arranged at a side of the light receiving element 102 of the image pickup apparatus, and light is illuminated from the side of the light receiving element 102 to a sensor that is positioned at the object 100 to evaluate the optical system 101. Similarly to a common shooting, a chart may be prepared at the side of the object 100 and the image of this chart may also be taken while the sensor is located at the position of the real light receiving element 102 to evaluate the performance of the optical system 101 of the image pickup apparatus. In any evaluation methods, the sensor that is to be used only has to be prepared in accordance with the evaluation, and a line sensor may be used when one cross section of the imaging performance is evaluated. Similarly to a real shooting, when the performance needs to be evaluated in all azimuth directions, a two-dimensional sensor may be used. The imaging performance to be evaluated may be the imaging performance itself of the optical system 101 having a production error, and alternatively, the imaging performance may also be an evaluation of the image restored by the restoration portion 105*c*. Furthermore, an image adjusted by the adjustment portion 105*d* can be sequentially evaluated, and the present embodiment is not limited to the methods described above.

The classification portion 105*b* is a portion that classifies the imaging state into a plurality kinds of states based on the level of the performance deterioration (the imaging performance) of the optical system 101 evaluated by the evaluation portion 105*a*. As described above, the deterioration characteristics of the image pickup apparatus can be finally classified into various kinds of patterns. The classification portion 105*b* determines the deterioration characteristics of the pattern that is closest to the performance deterioration by the optical system 101, and makes the classification in accordance with the restoration filter that is to be used. For example, when a rotationally asymmetric aberration that has different performances at four corners of the image is generated, the maximum value and the minimum value of sizes of imaging spots at the four corners are compared and the comparison result can be used as a reference of the classification. The classification portion 105*b* may make the classification based on the imaging performance evaluated by the evaluation portion 105*a*, and alternatively it may also make the classification using an image adjusted by the adjustment portion 105*d*. Restoration filter information that is finally stored in the image pickup apparatus can be rewritten by restoration filter information that is generated based on the classification by the classification portion 105*b*. Thus, since the number of the filters that is stored in the side of the image pickup apparatus, a memory of the image pickup apparatus can be efficiently used.

The restoration portion 105*c* is a portion that restores the performance of the optical system 101, which restores the received optical image using one desired restoration filter. The image of the chart by the optical system 101 is received by the sensor of the image pickup apparatus to be converted into an electric signal. This signal is treated as an input signal to be able to perform an image processing that is similar to the image restoration processing described above. For example, when the chart that is disposed at a side of the object 100 is received by the sensor that is disposed at a surface of the light receiving element 102, the restoration filter 103*b* that is used in the image pickup apparatus can be used. When the chart that is disposed at a side of the light receiving element 102 is received by a surface of the object 100, a restoration filter for adjustment is generated based on the restoration filter 103*b* that is to be used in the image pickup apparatus to be able to perform the image restoration processing. As a restoration filter that is used in the restoration portion 105*c*, an average of the optical transfer functions of the image pickup apparatus in which the production variability is generated is used. However, in this case, an excess restoration is performed in some cases with respect to a lens having a performance that is higher than an average optical performance. In such a case, the restoration filter 103*b* may be used based on the optical transfer function of the optical system having the performance that is highest of the imaging performances having the production variability. With respect to the restoration filter 103*b*, the final performance in which the production variability has been adjusted only has to be the highest, and the present embodiment is not limited to them. The restoration filter 105*c* may restore the imaging performance itself of the optical system 101 having the production variability, and alternatively it may also perform the restoration processing for the image evaluated by the evaluation portion 105*a*.

The adjustment portion 105*d* is a portion that adjusts the performance of the optical system 101, which drives the adjustment unit 101*a* to correct the performance deterioration caused by the production variability. When the adjustment unit 101*a* of the optical system 101 is driven to change a position of the adjustment unit 101*a*, the optical transfer function can be continuously and finely changed. The variability adjustment apparatus 105 changes the adjustment unit 101*a* so as to cancel the difference between the design value and the optical transfer function of the image pickup apparatus having the production variability. The adjustment unit 101*a* is configured to be able to change a part or whole of the optical system 101 of the image pickup apparatus. In addition to this, the adjustment unit 101*a* may also be configured so as to change a position of the light receiving element 102. As a specific method of changing the adjustment unit 101*a*, there is a method of providing a shift decentering or a tilt decentering with the adjustment unit 101*a* or a method of gradually moving the adjustment unit 101a in an optical axis direction. These change the optical transfer function by a mechanical change, but the optical transfer function may also be electrically changed using a phase modulation element or a liquid crystal lens. The adjustment portion 105d may adjust the imaging performance itself of the optical system 101 having the production error, and alternatively it may also adjust the image restored by the restoration portion 105c.

Embodiment 1

Figure 7:
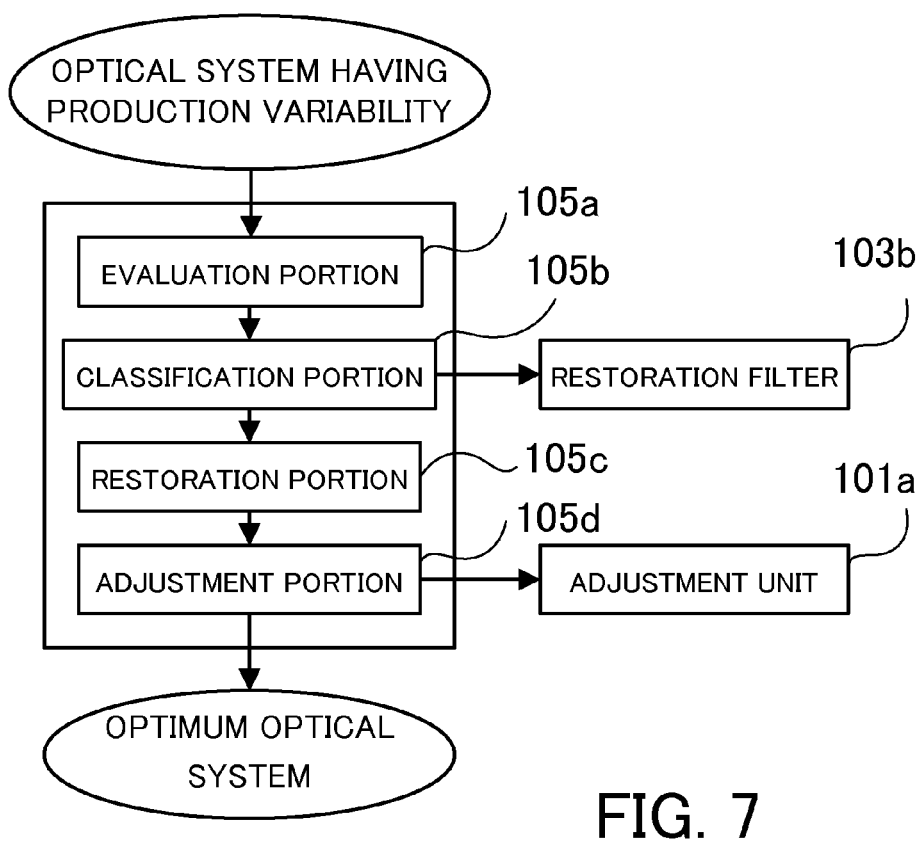
FIG. 7 is a diagram of describing an adjustment method for an image pickup apparatus in Embodiment 1.

Hereinafter, referring to FIG. 7, an image pickup apparatus in Embodiment 1 of the present invention will be described. In the present embodiment, the imaging performance for the optical system 101 of the image pickup apparatus is evaluated by the evaluation portion 105a (an evaluation step), and the classification is performed by the classification portion 105b based on the evaluation of the evaluation portion 105a (a classification step). Based on the information classified by the classification portion 105b, one desired restoration filter is selected from among the plurality of restoration filters 103b that have been previously patterned. The image restoration processing is performed using this restoration filter (a restoration step), and the adjustment unit 101a of the optical system 101 is adjusted based on the restored image to optimize the imaging performance of the image pickup apparatus (an adjustment step). In the present embodiment, the plurality of previously-patterned restoration filters can be used. However, the present embodiment is not limited to this, and one desired optical transfer function may also be selected from among previously-patterned optical transfer functions. In this case, the Fourier transform can be performed for a function based on an inverse of the selected optical transfer function to generate the restoration filter to perform the image restoration processing using the generated restoration filter. In other words, the optical transfer characteristics that are classified in accordance with the production variability are obtained and the image restoration processing is performed based on the obtained optical transfer function to generate a restoration image.

The characteristics of this method are that the adjustment based on the restored image can be performed. As a result, a total performance of the image pickup apparatus, i.e. a final image of the image pickup apparatus can be directly optimized. In the present embodiment, additionally, the performance deterioration is corrected in accordance with the restored image that has been restored by the restoration filter 103b selected by the classification portion 105b to be able to be converted to a local optimum solution. Originally, a lens that has a design value is the optimum solution, and the image pickup apparatus having the production error is in a state of being shifted from this solution. Conventionally, the adjustment was performed by changing the adjustment unit so as to come close to the state of this optimum solution. In the present embodiment, however, the restoration filter 103b is patterned and the adjustment is performed for the selected restoration filter. This means that the adjustment is performed so as to come close to the local optimum solution by the restoration filter 103b, which is different from the optimum solution for the design value. According to the present embodiment, the imaging performance of the optical system can be optimized with a small storage capacity.

Embodiment 2

Figure 8:
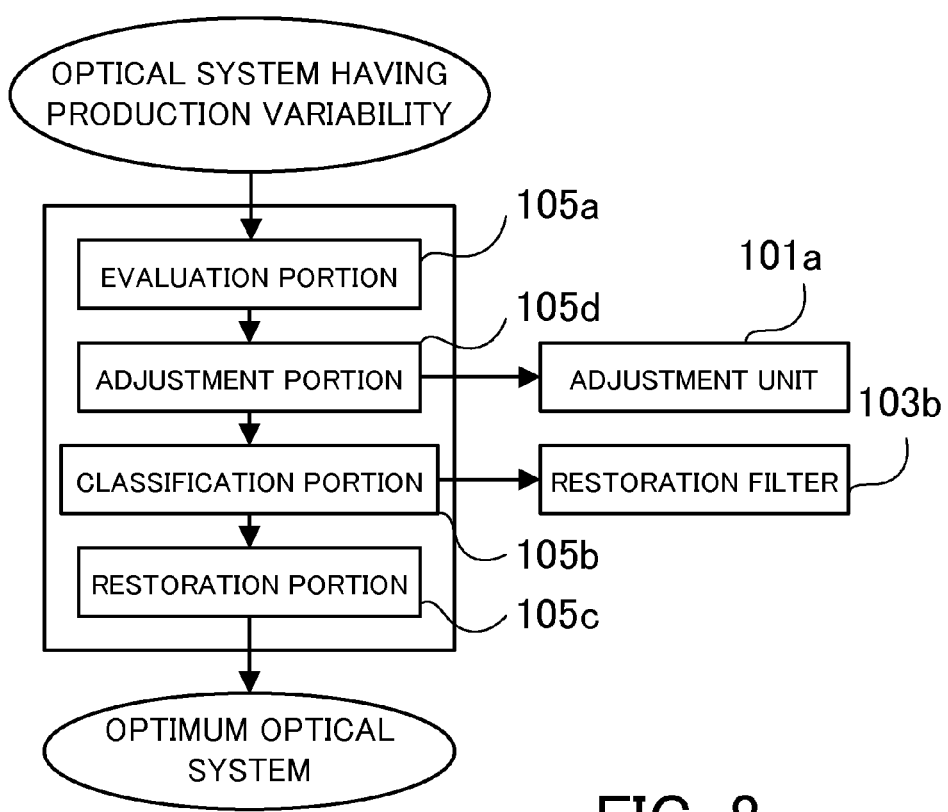
FIG. 8 is a diagram of describing an adjustment method for an image pickup apparatus in Embodiment 2.

Hereinafter, referring to FIG. 8, an image pickup apparatus in Embodiment 2 of the present invention will be described. In the present embodiment, the imaging performance for the optical system 101 of the image pickup apparatus is evaluated by the evaluation portion 105a, and the adjustment unit 101a is controlled to be driven by the adjustment portion 105d based on the evaluation of the evaluation portion 105a. The classification is performed for performance adjusted by the adjustment portion 105d using the classification portion 105b. Furthermore, based on the information classified by the classification portion 105b, a desired restoration filter is selected from among the previously-patterned restoration filters 103b. Thus, in the present embodiment, the restoration filter is selected based on the imaging state classified by the classification portion 105b after the adjustment unit 101a corrects the performance deterioration. The image restoration processing is performed by using this restoration filter to confirm the final image.

Embodiment 1 performs the adjustment that is suitable for the restoration filter, and on the other hand the present embodiment selects the restoration filter that is suitable for the variability adjustment, which is different from Embodiment 1. In the method of the present embodiment, since the adjustment step itself is similar to the adjustment step in which the conventional image restoration processing is not used, it is especially advantageous in that the conventional production line can be used without any change.

Embodiment 3

In the adjustment methods of Embodiments 1 and 2, the imaging performance of the image pickup apparatus that does not include the image restoration processing needs to be sufficiently high. However, with respect to the image pickup apparatus that performs the image restoration processing, since the performance after the image restoration processing only has to be high, the performance of the image pickup apparatus that does not include the image restoration processing is lower than the performance of the conventional image pickup apparatus in some cases. In this case, the change of the performance for the shift of the adjustment unit 101a becomes small, and the performance sensitivity for the variability adjustment becomes low. In other words, when the adjustment unit 101a is shifted by the variability adjustment to a position where the performance is highest, it is difficult to specify the position where the performance is highest and the adjustment accuracy becomes low. In Embodiment 3 of the present embodiment, a method of handling the case is achieved.

Figure 9:
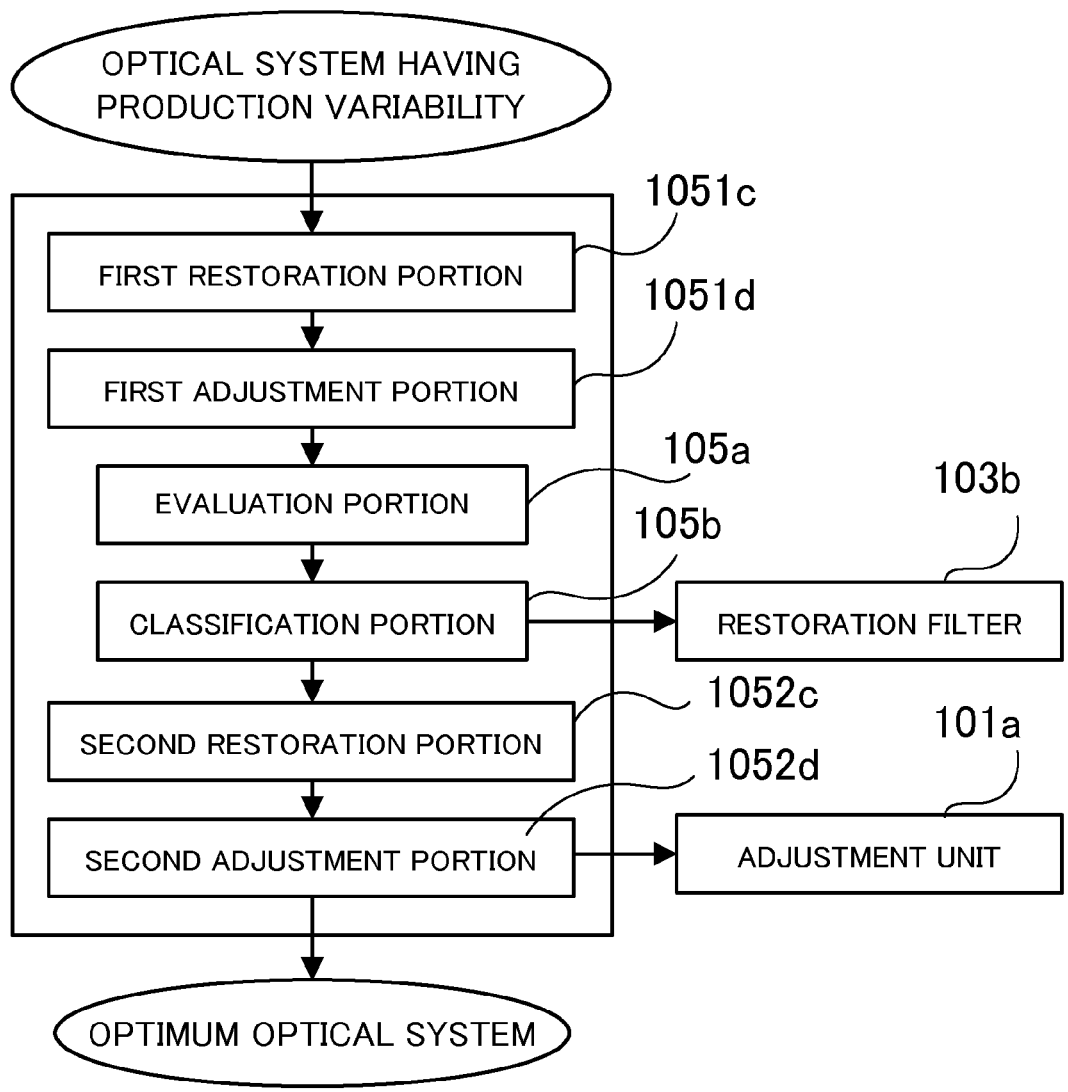
FIG. 9 is a diagram of describing an adjustment method for an image pickup apparatus in Embodiment 3.

Hereinafter, referring to FIG. 9, an image pickup apparatus in Embodiment 3 of the present invention will be described. In the present embodiment, the image restoration is performed for the imaging performance for the optical system 101 of the image pickup apparatus by using a first restoration portion 1051c. As a result, the performance sensitivity at the time of the adjustment can be enlarged and the adjustment accuracy can be heightened. The restoration filter that is used in the first restoration portion 1051c only has to be a restoration filter that can achieve this purpose, and for example a restoration filter that is generated based on the optical transfer function of the optical system 101 having the design value may be used.

Subsequently, the adjustment is performed by a first adjustment portion 1051d based on the restored image, and the evaluation is performed by the evaluation portion 105a based on this adjustment result. Then, the classification is performed by the classification portion 105b based on the result of the evaluation portion 105a, and a desired restoration filter is selected from among the previously-patterned restoration filters 103*b* based on the classified information. Similarly to Embodiment 1, the restoration processing is performed by using the selected restoration filter and the adjustment that is suitable for the restoration filter is performed to be able to optimize the performance of whole of the image pickup apparatus. Then, a second restoration portion 1052*c* performs a restoration processing using the selected restoration filter, and a second adjustment portion 1052*d* performs an adjustment that is suitable for the restoration filter 103*b* to be able to optimize the performance of whole of the image pickup apparatus.

Embodiment 4

Embodiment 4 of the present invention is an embodiment of combining Embodiments 1 and 2. After the adjustment of an image pickup apparatus is performed based on the conventional production step similarly to Embodiment 2, the performance of whole of the image pickup apparatus is optimally adjusted by using the method of Embodiment 1.

Figure 10:
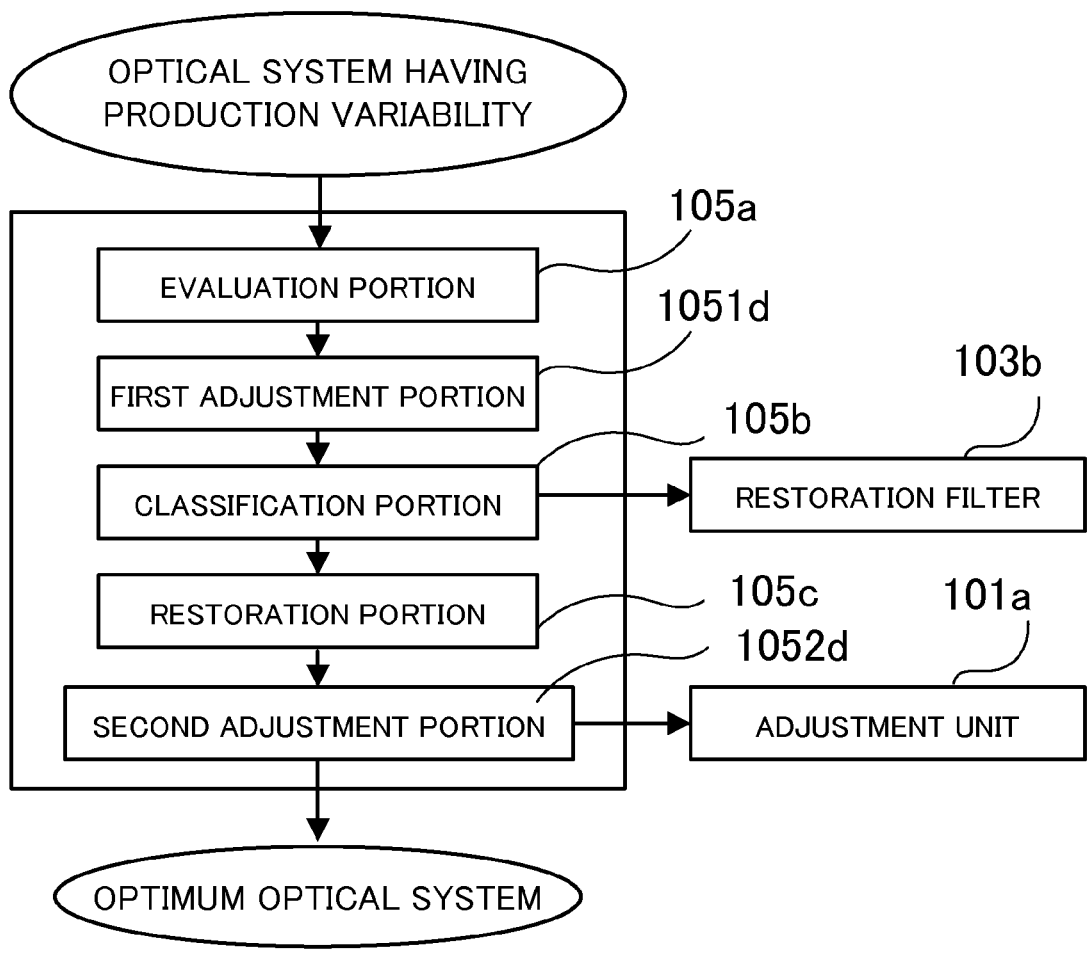
FIG. 10 is a diagram of describing an adjustment method for an image pickup apparatus in Embodiment 4.

Hereinafter, referring to FIG. 10, the image pickup apparatus in the present embodiment will be described. First of all, the imaging performance for the optical system 101 of the image pickup apparatus is performed by the evaluation portion 105*a*, and the first adjustment portion 1051*d* is performed based on the evaluation portion 105*a*. After the adjustment is performed by the first adjustment portion 1051*d*, the classification is performed by using the classification portion 105*b*. Then, based on the information classified by the classification portion 105*b*, a desired restoration filter is selected from among the previously-patterned restoration filters 103*b*. The image restoration processing is performed by using this restoration filter, and the adjustment is performed by the second adjustment portion 1052*d*. Then, the adjustment unit 101*a* of the optical system 101 is adjusted to optimize the imaging performance of the image pickup apparatus.

The characteristics of this method are that the restoration filter 103*b* that is used in the restoration portion 105*c* can be generated for the patterned characteristics of the performance deterioration remaining after the adjustment by the first adjustment portion 1051*d*. The image pickup apparatuses classified into several patterns contain variability even in the classification. The variability in this classification can be suppressed by the first adjustment portion 1051*d*. When the variability is small, the level of the restoration can be strengthened because a negative effect of the restoration does not easily occur. Furthermore, the adjustment is performed for such the restoration filter 103*b* by using the second adjustment portion 1052*d* to be able to achieve a high-performance image pickup apparatus by searching the local solution.

Embodiment 5

Embodiment 5 of the present invention is different from Embodiment 4 in that an image pickup apparatus classified by the classification portion 105*b* is divided into a case in which the adjustment by the second adjustment portion 1052*d* is needed and a case in which the adjustment is not needed. In other words, the classification portion 105*b* in the present embodiment includes not only a portion that classifies the performance but also a portion that determines whether the performance is good or not. Thus, the necessity of performing the adjustment by the second adjustment portion 1052*d* is determined to be able to reduce an unnecessary adjustment step to suppress the increase of the production cost.

Figure 11:
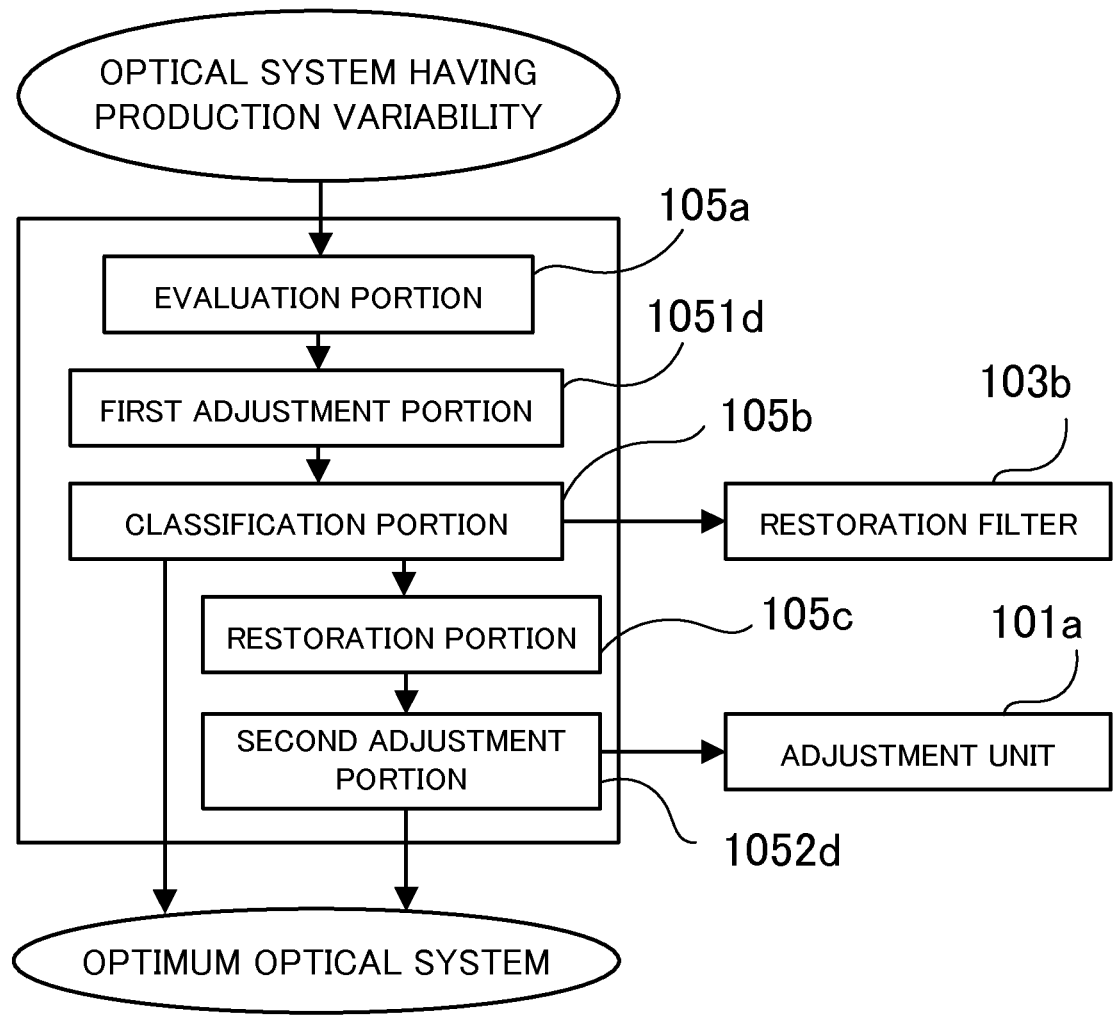
FIG. 11 is a diagram of describing an adjustment method for an image pickup apparatus in Embodiment 5.

Hereinafter, referring to FIG. 11, the image pickup apparatus in the present embodiment will be described. In the present embodiment, first of all, the imaging performance for the optical system 101 of the image pickup apparatus is evaluated by the evaluation portion 105*a*, and the adjustment is performed by the first adjustment portion 1051*d* based on the evaluation of the evaluation portion 105*a*. After the adjustment is performed by the first adjustment portion 1051*d*, the classification is performed by using the classification portion 105*b*. Subsequently, whether the adjustment by the second adjustment portion 1052*d* is necessary or not is determined with respect to the classified image pickup apparatus. Receiving this result, with respect to the image pickup apparatus that does not need the adjustment by the second adjustment portion 1052*d*, a high-performance image pickup apparatus can be achieved only by the image restoration processing based on the classification. On the other hand, with respect to the image pickup apparatus that needs the adjustment by the second adjustment portion 1052*d*, a desired restoration filter is selected from among the previously-patterned restoration filters 103*b* based on the classified information. Then, the restoration portion 105*c* performs the restoration processing using the selected restoration filter and the second adjustment portion 1052*d* performs the adjustment that is suitable for the restoration filter 103*b* to be able to optimize the performance of whole of the image pickup apparatus.

Embodiment 6

In the conventional image pickup apparatus, a plurality of adjustment units 101*a* are provided as a required performance becomes higher. In Embodiment 6 of the present invention, a method of the adjustment when the optical system 101 is configured by including two adjustment units (a first adjustment unit 1011*a* and a second adjustment unit 1012*a*) will be described. When the two adjustment units are provided, the evaluations by the evaluation portions (the first evaluation portion 1051*a* and the second evaluation portion 1052*a*), and the classifications by the classification portions (the first classification portion 1051*b* and the second classification portion 1052*b*) are performed corresponding to each adjustment unit. The same is true for the restoration portions (the first restoration portion 1051*c* and the second restoration portion 1052*c*) and the adjustment portions (the first adjustment portion 1051*d* and the second adjustment portion 1052*d*).

Figure 12:
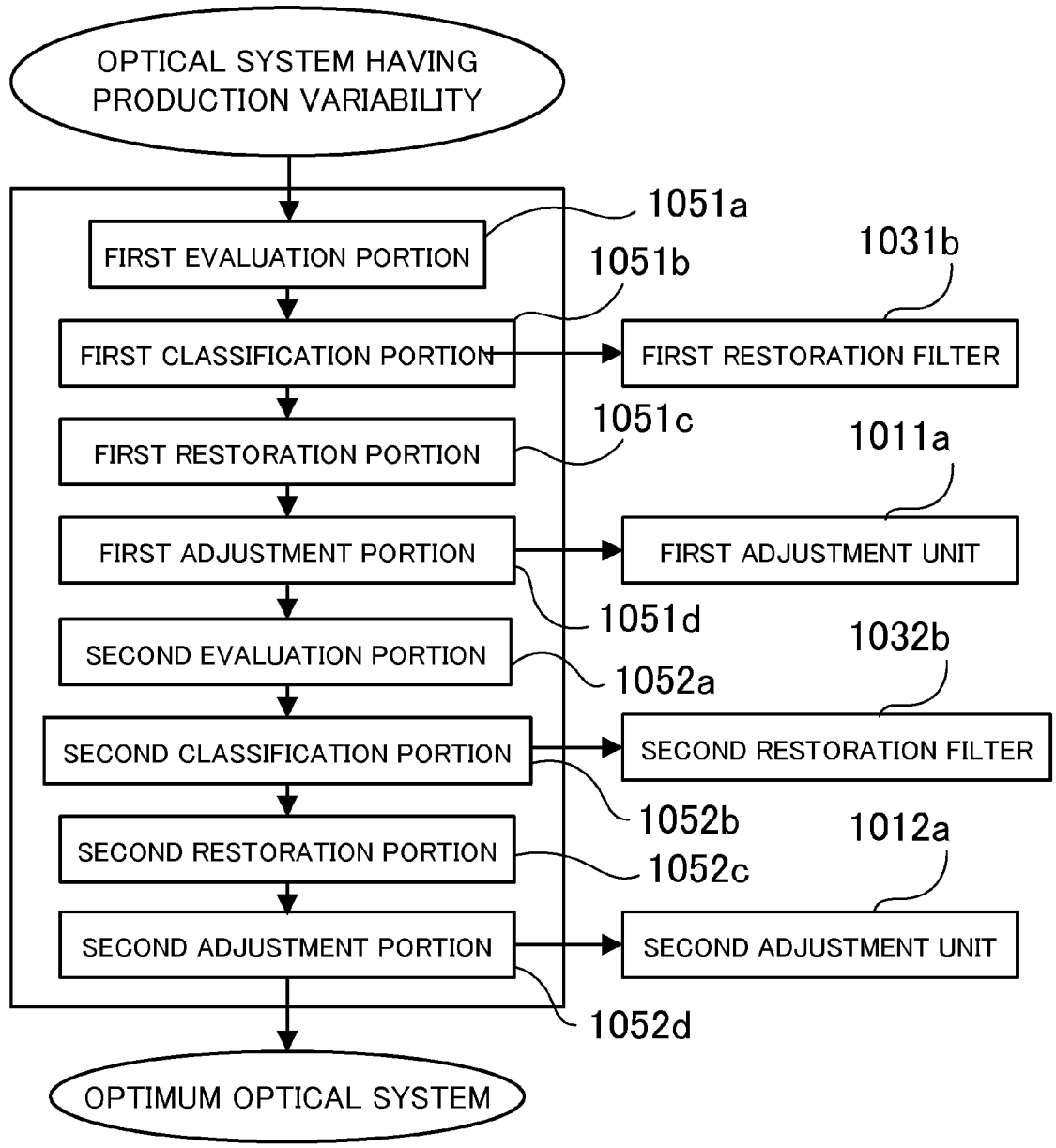
FIG. 12 is a diagram of describing an adjustment method for an image pickup apparatus in Embodiment 6.

Hereinafter, referring to FIG. 12, an image pickup apparatus in the present embodiment will be described. In the present embodiment, the imaging performance for the optical system 101 of the image pickup apparatus is evaluated by the first evaluation portion 1051*a*, and the classification is performed by the first classification portion 1051*b* based on the evaluation of the first evaluation portion 1051*a*. Based on the information classified by the first classification portion 1051*a*, a desired restoration filter is selected from among the previously-patterned first restoration filters 1031*b*. The restoration is performed by the first restoration portion 1051*c* using this restoration filter and the first adjustment unit 1011*a* of the optical system 101 is adjusted by the first adjustment portion 1051*d* based on the restored image to optimize the imaging performance of the image pickup apparatus.

Furthermore, the evaluation is performed by the second evaluation portion 1052*a* based on the adjusted imaging performance, and the classification is performed by the second classification portion 1052*b* based on the second evaluation portion 1052*a*. Based on the information classified by the second classification portion 1052*b*, a desired restoration filter is selected from among the previously-patterned second restoration filters 1032*b*. The second restoration filter 1032*b* may be generated based on the information of the optical transfer function adjusted by the first restoration portion 1051c and the first adjustment portion 1051d, and alternatively it may also be generated in accordance with the adjustment by each adjustment unit. The restoration is performed by the second restoration portion 1052c using this restoration filter and the second adjustment unit 1012a of the optical system 101 is adjusted by the second adjustment portion 1052d based on the restored image to optimize the imaging performance of the image pickup apparatus. The final performance of the image pickup apparatus is optimized by the second restoration portion 1052c using the second restoration filter 1032b. Therefore, the information related to this restoration filter is obtained by the image pickup apparatus to be stored in a memory to be able to achieve a high-performance image pickup apparatus. In the present embodiment, the case in which the two adjustment units are provided, but the adjustment can also be performed by the same step even when three or more adjustment units are provided.

According to each of the embodiments described above, an adjustment method and an adjustment apparatus that reduce the performance deterioration caused by production variability of an optical system and a light receiving element with a small storage capability can be provided. Furthermore, a method of manufacturing the optical system that is adjusted by using the adjustment method in each embodiment, and an image pickup apparatus that is adjusted by using the adjustment method in each embodiment and a method of manufacturing the image pickup apparatus can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-244907, filed on Nov. 1, 2010, and Japanese Patent Application No. 2011-180467, filed on Aug. 22, 2011, which are hereby incorporated by reference herein in their entirety.

What is claimed is:

1. An adjustment method comprising:
an evaluation step of evaluating an imaging performance of an optical system;
a classification step of classifying the imaging performance evaluated in the evaluation step;
a restoration step of generating a restored image of an optical image that is formed via the optical system, based on a classification of the imaging performance; and
an adjustment step of adjusting the optical system using an adjustment unit of the optical system based on the restored image.

2. The adjustment method according to claim 1, wherein the restoration step generates a restoration image of the optical image using at least one of an optical transfer function and an image restoration filter based on the classification, and
wherein the adjustment method further comprises a storage step of storing at least one of an optical transfer function and an image restoration filter in a storage portion of the image pickup apparatus that includes the optical system adjusted in the adjustment step.

3. The adjustment method according to claim 1, further comprising a comparison step of comparing the maximum value and the minimum value of a size of an imaging spot of the optical image evaluated in the evaluation step,
wherein the classification step classifies the imaging performance in accordance with a result of the comparison step.

4. The adjustment method according to claim 1, wherein the evaluation step evaluates an aberration that is asymmetric with respect to an image center, and
wherein the classification step classifies the imaging performance of the optical system according to the aberration that is asymmetric with respect to the image center.

5. An adjustment method comprising:
an adjustment step of adjusting an optical system using an adjustment unit of the optical system;
an evaluation step of evaluating an imaging performance of the optical system adjusted in the adjustment step;
a classification step of classifying the imaging performance evaluated in the evaluation step; and
a storage step of storing at least one of an optical transfer function and an image restoration filter that corresponds to a classification of the imaging performance in a storage portion of an image pickup apparatus that includes the optical system adjusted in the adjustment step.

6. The adjustment method according to claim 5,
wherein at least one of the optical transfer function and the image restoration filter is configured so as to correct a decentering coma aberration.

7. The adjustment method according to claim 5, further comprising a comparison step of comparing the maximum value and the minimum value of a size of an imaging spot of the optical image evaluated in the evaluation step,
wherein the classification step classifies the imaging performance in accordance with a result of the comparison step.

8. The adjustment method according to claim 5, wherein the evaluation step evaluates an aberration that is asymmetric with respect to an image center, and
wherein the classification step classifies the imaging performance of the optical system according to the aberration that is asymmetric with respect to the image center.

9. An adjustment method comprising:
an evaluation step of evaluating an imaging performance of an optical system;
an adjustment step of adjusting an optical system using an adjustment unit of the optical system;
a classification step of classifying the imaging performance of the optical system adjusted in the adjustment step; and
a restoration step of generating a restored image of an optical image that is formed via the optical system adjusted in the adjustment step, based on a classification of the imaging performance.

10. The adjustment method according to claim 9,
wherein the restoration step generates the restored image using at least one of an optical transfer function and an image restoration filter based on the classification, and
wherein the adjustment method further comprises a storage step of storing at least one of the optical transfer function and the image restoration filter in a storage portion of an image pickup apparatus that includes the optical system adjusted in the adjustment step.

11. The adjustment method according to claim 9, further comprising a comparison step of comparing the maximum value and the minimum value of a size of an imaging spot of the optical image that is formed via the optical system adjusted in the adjustment step,
wherein the classification step classifies the imaging performance in accordance with a result of the comparison step.

12. The adjustment method according to claim 9, wherein the evaluation step evaluates an aberration that is asymmetric with respect to an image center, and wherein the classification step classifies the imaging performance of the optical system according to the aberration that is asymmetric with respect to the image center.

13. An adjustment apparatus comprising:

an evaluation portion configured to evaluate an imaging performance of an optical system;

a classification portion configured to classify the imaging performance evaluated by the evaluation portion;

a restoration portion configured to generate a restored image of an optical image that is formed via the optical system, based on a classification of the imaging performance; and an adjustment portion configured to adjust the optical system using an adjustment unit of the optical system based on the restored image.

14. An adjustment apparatus comprising:

an adjustment portion configured to adjust an optical system using an adjustment unit of the optical system;

an evaluation portion configured to evaluate an imaging performance of the optical system adjusted by the adjustment portion;

a classification portion configured to classify the imaging performance evaluated by the evaluation portion; and a portion configured to store at least one of an optical transfer function and an image restoration filter that corresponds to a classification of the imaging performance in a storage portion of an image pickup apparatus that includes the optical system adjusted by the adjustment portion.

15. An adjustment apparatus comprising:

an evaluation portion configured to evaluate an imaging performance of an optical system;

an adjustment portion configured to adjust an optical system using an adjustment unit of the optical system;

a classification portion configured to classify the imaging performance adjusted by the adjustment portion; and a restoration portion configured to generate a restored image of an optical image that is formed via the optical system adjusted by the adjustment portion, based on a classification of the imaging performance.

16. A method of manufacturing an optical system, comprising:

an assembly step of assembling the optical system;

an evaluation step of evaluating an imaging performance of the optical system;

a classification step of classifying the imaging performance evaluated in the evaluation step;

a restoration step of generating a restored image of an optical image that is formed via the optical system, based on a classification of the imaging performance; and an adjustment step of adjusting the optical system using an adjustment unit of the optical system based on the restored image.

17. A method of manufacturing an image pickup apparatus, comprising:

an assembly step of assembling the optical system;

an adjustment step of adjusting an optical system using an adjustment unit of the optical system;

an evaluation step of evaluating an imaging performance of the optical system adjusted in the adjustment step;

a classification step of classifying the imaging performance evaluated in the evaluation step; and a storage step of storing at least one of an optical transfer function and an image restoration filter that corresponds to a classification of the imaging performance in a storage portion of the image pickup apparatus that includes the optical system adjusted in the adjustment step.

18. A method of manufacturing an image pickup apparatus, comprising:

an assembly step of assembling the optical system;

an evaluation step of evaluating an imaging performance of an optical system;

an adjustment step of adjusting the optical system using an adjustment unit of the optical system;

a classification step of classifying the imaging performance of the optical system adjusted in the adjustment step; and a restoration step of generating a restored image of an optical image that is formed via the optical system adjusted in the adjustment step, based on a classification of the imaging performance.

* * * * *